(12) United States Patent  
Mitsui

(10) Patent No.: US 9,830,544 B2
(45) Date of Patent: Nov. 28, 2017

(54) IMAGE PROCESSING APPARATUS, CONTROL METHOD, AND STORAGE MEDIUM FOR EXECUTING PRINT PROCESSING USING A PASSWORD INCLUDING SELECTING A PERSONAL IDENTIFICATION CODE TYPE THAT INDICATES A PURPOSE FOR USING THE PASSWORD

(71) Applicant: CANON KABUSHIKI KAISHA, Tokyo (JP)

(72) Inventor: Akihiro Mitsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 14/328,570

(22) Filed: Jul. 10, 2014

(65) Prior Publication Data

US 2015/0015910 A1 Jan. 15, 2015

(30) Foreign Application Priority Data

Jul. 12, 2013 (JP) ................................. 2013-146309

(51) Int. Cl.
*G06F 3/12* (2006.01)
*G06K 15/00* (2006.01)
*H04N 7/16* (2011.01)
*G06F 7/04* (2006.01)
(Continued)

(52) U.S. Cl.
CPC ....... *G06K 15/4095* (2013.01); *G06F 3/1222* (2013.01); *G06F 3/1238* (2013.01);
(Continued)

(58) Field of Classification Search
CPC .... G06F 21/608; G06F 21/60; G06F 21/6209;
G06F 3/002; G06F 3/038; G06F 3/1222;
G06F 3/1238; G06F 3/128; G06F 3/1285;
G06F 3/1205; G06F 3/1203; G06F
3/1208; G06F 3/1253; G06F 3/1206;
G06F 3/1268; G06F 21/606; G06F
21/629; H04L 67/04; H04L 9/3226; H04L
63/0869; H04L 63/083; H04L 63/0815;
H04N 1/4413; H04N 1/444; H04N
1/0097;
(Continued)

(56) References Cited

U.S. PATENT DOCUMENTS 6,618,566 B2 * 9/2003 Kujirai .................. G03G 21/02
399/79
7,286,250 B2 * 10/2007 Kujirai .................. G06F 3/1222
358/1.15

(Continued)

FOREIGN PATENT DOCUMENTS

JP 2005-301500 A 10/2005
JP 2010-218287 A 9/2010

OTHER PUBLICATIONS

Windows 8: Changing password (setting), Jan. 23, 2013, http://web.archive.org/web/20130123195618/http://pasoble.jp/windows/8/08871.html.

*Primary Examiner* — Hai Phan
*Assistant Examiner* — Jonathan R Beckley
(74) *Attorney, Agent, or Firm* — Canon U.S.A. Inc., IP Division

(57) ABSTRACT

There is provided an information processing apparatus, in which a purpose of a password can be selected from a plurality of purposes, and a print job, in which the password is used for the selected purpose, is generated.

15 Claims, 12 Drawing Sheets

(51) Int. Cl.
*G06F 17/30* (2006.01)
*G06F 21/60* (2013.01)

(52) U.S. Cl.
CPC .......... *G06F 3/1285* (2013.01); *G06F 21/608* (2013.01); *G06K 15/002* (2013.01)

(58) Field of Classification Search
CPC ....... H04N 2201/3246; H04N 1/00225; H04N 1/4406; H04N 1/00408; H04N 1/00413; H04N 1/00416; H04N 1/00435; H04N 2201/3276; H04N 2201/3277
USPC .... 358/1.6, 3.28, 1.13, 1.14, 1.15, 1.16, 1.1; 715/200, 255, 700, 733, 741, 743, 747, 715/750; 726/26, 27, 28, 29, 30, 31, 32, 726/33; 713/183, 184, 168, 170; 399/80, 399/81, 82, 366; 705/51; 700/17
See application file for complete search history.

(56) References Cited

U.S. PATENT DOCUMENTS

| | | | | |
|---|---|---|---|---|
| 7,480,069 B2* | 1/2009 | Yoshida | | G06F 21/608 |
| | | | | 345/156 |
| 7,661,589 B2* | 2/2010 | Atobe | | G07C 9/00158 |
| | | | | 235/382 |
| 7,746,488 B2* | 6/2010 | Ahn | | H04N 1/0084 |
| | | | | 358/1.14 |
| 7,801,918 B2* | 9/2010 | Iwase | | G06F 21/608 |
| | | | | 707/705 |
| 7,889,375 B2* | 2/2011 | Kujirai | | G06F 3/1222 |
| | | | | 358/1.15 |
| 8,125,657 B2* | 2/2012 | Kato | | G06F 3/1219 |
| | | | | 358/1.13 |
| 8,127,343 B2* | 2/2012 | Asai | | G06F 21/608 |
| | | | | 358/1.14 |
| 8,130,951 B2* | 3/2012 | Tian | | G06Q 10/06 |
| | | | | 235/432 |
| 8,139,239 B2* | 3/2012 | Tominaga | | G06F 3/121 |
| | | | | 358/1.13 |
| 8,432,560 B2* | 4/2013 | Fukunishi | | G06F 3/1222 |
| | | | | 358/1.14 |
| 8,605,320 B2 | 12/2013 | Goto | | |
| 8,749,808 B2* | 6/2014 | Utsumi | | 358/1.14 |
| 8,982,376 B2* | 3/2015 | Hosoda | | G06K 15/1817 |
| | | | | 358/1.14 |
| 9,310,973 B2* | 4/2016 | Yamada | | G06F 3/0484 |
| 2005/0100378 A1* | 5/2005 | Kimura | | G06F 3/1222 |
| | | | | 400/76 |
| 2009/0244595 A1* | 10/2009 | Kim et al. | | 358/1.15 |
| 2014/0033090 A1* | 1/2014 | Yamada | | G06F 3/0484 |
| | | | | 715/764 |

\* cited by examiner

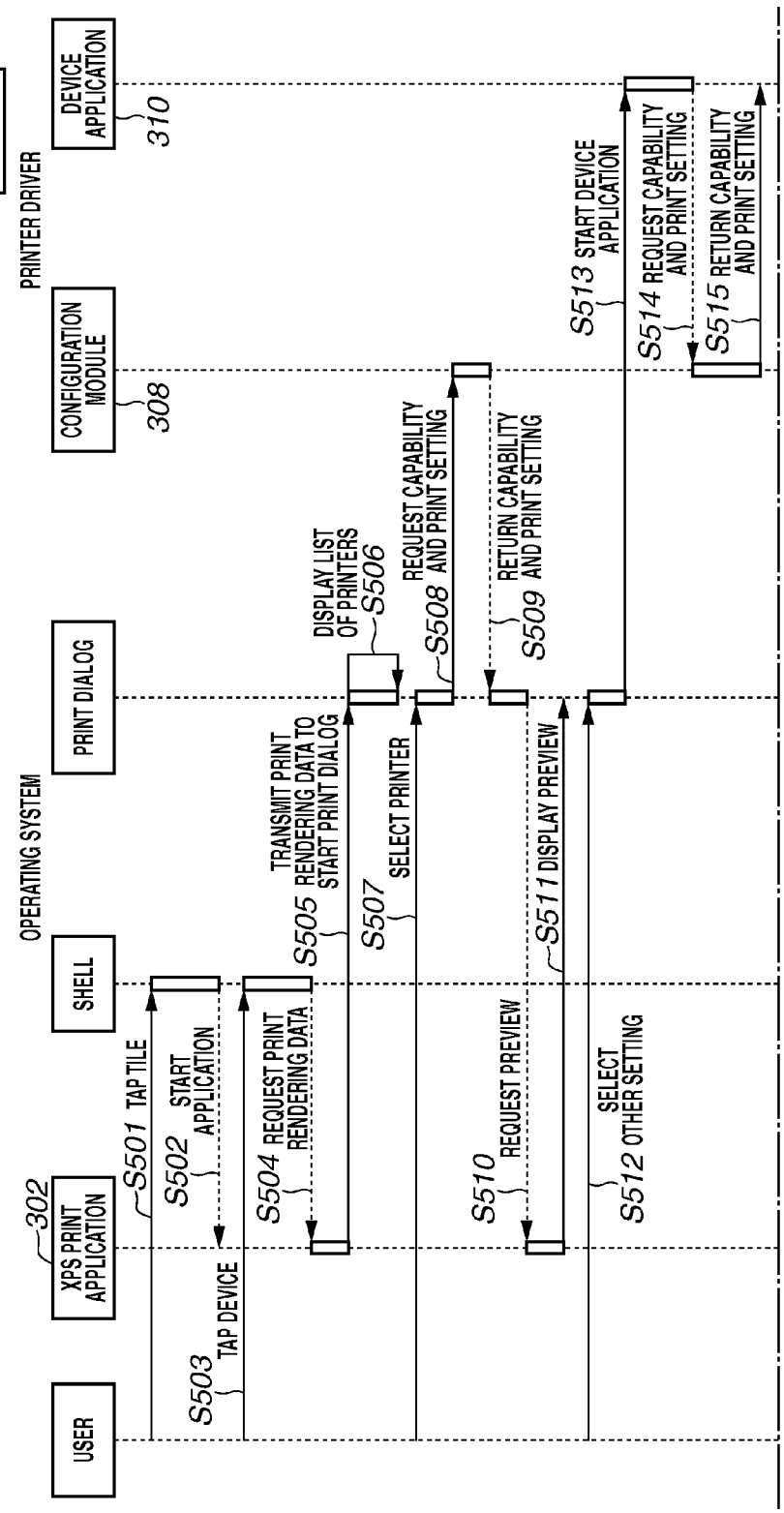

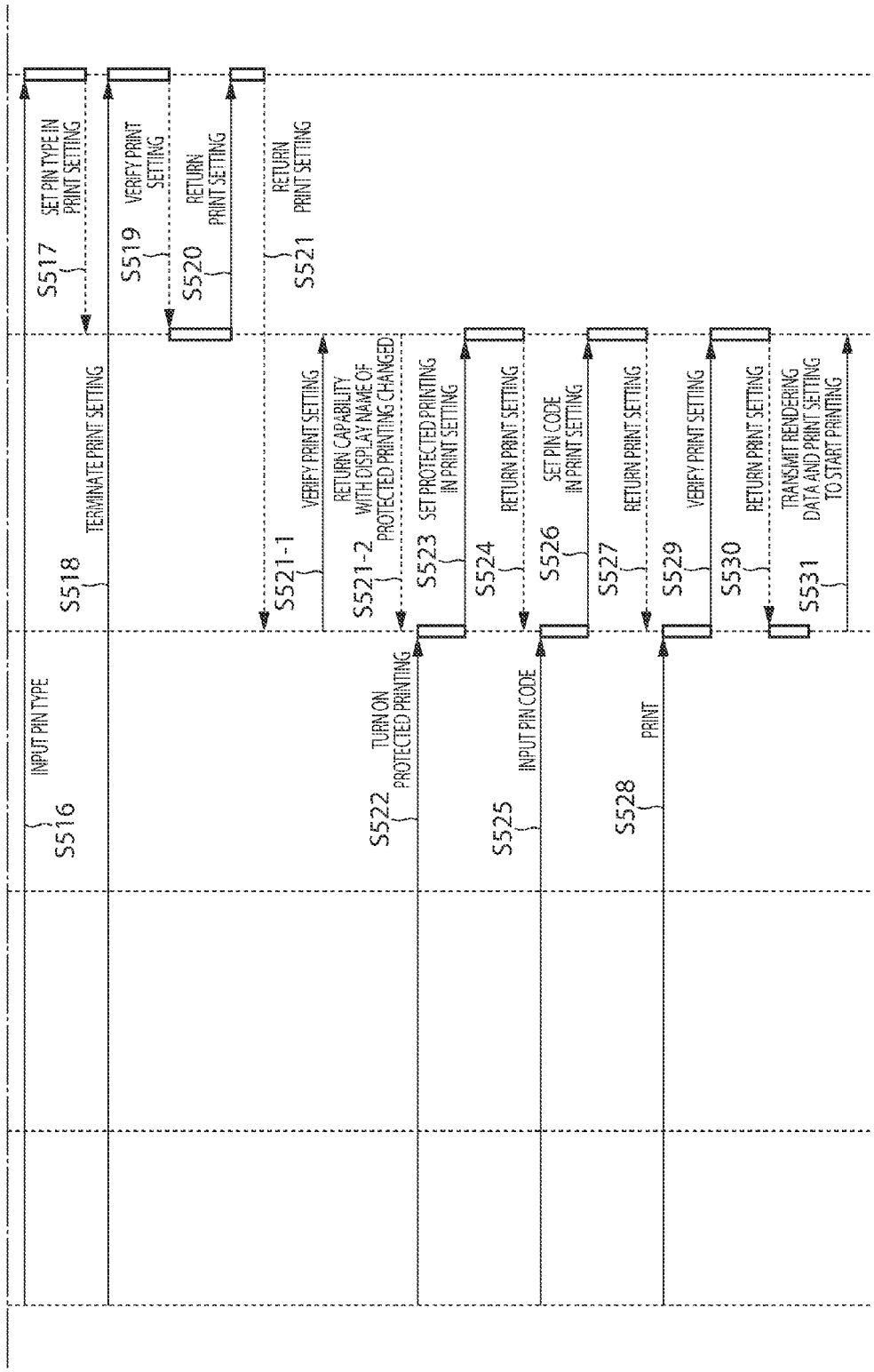

IMAGE PROCESSING APPARATUS, CONTROL METHOD, AND STORAGE MEDIUM FOR EXECUTING PRINT PROCESSING USING A PASSWORD INCLUDING SELECTING A PERSONAL IDENTIFICATION CODE TYPE THAT INDICATES A PURPOSE FOR USING THE PASSWORD

BACKGROUND OF THE INVENTION

Field of the Invention

The present invention relates to an information processing apparatus, a control method, and a program for executing print processing using a password.

Description of the Related Art

U.S. Pat. No. 8,605,320 discloses secure print, which is a function for preventing information leakage through a print product. When the secure print is set, a print job, having a user ID and a password set, is transmitted to an image processing apparatus. The printing is executed when a user selects a desired print job in an operation panel of the image processing apparatus, and inputs the correct user ID and password.

However, in U.S. Pat. No. 8,605,320, the set password cannot be used for other functions, and thus cannot be used for other purposes.

SUMMARY OF THE INVENTION

According to an aspect of the present invention, an information processing apparatus in which, on which a device application, installed in conjunction with installing of a printer driver that generates a print job, is able to operate, includes: a selection unit configured to select a purpose of a password set in a second screen provided by an operating system, in accordance with an instruction input through a first screen provided by the device application; an acquisition unit configured to acquire the password set in the second setting screen; and a generation unit configured to generate a print job in which the acquired password is used for the selected purpose.

Further features of the present invention will become apparent from the following description of exemplary embodiments with reference to the attached drawings.

BRIEF DESCRIPTION OF THE DRAWINGS

FIG. 5 (including 5A and 5B) is a sequence diagram illustrating operations from print setting to print start.

DESCRIPTION OF THE EMBODIMENTS

Various exemplary embodiments, features, and aspects of the invention will be described in detail below with reference to the drawings.

Figure 1:
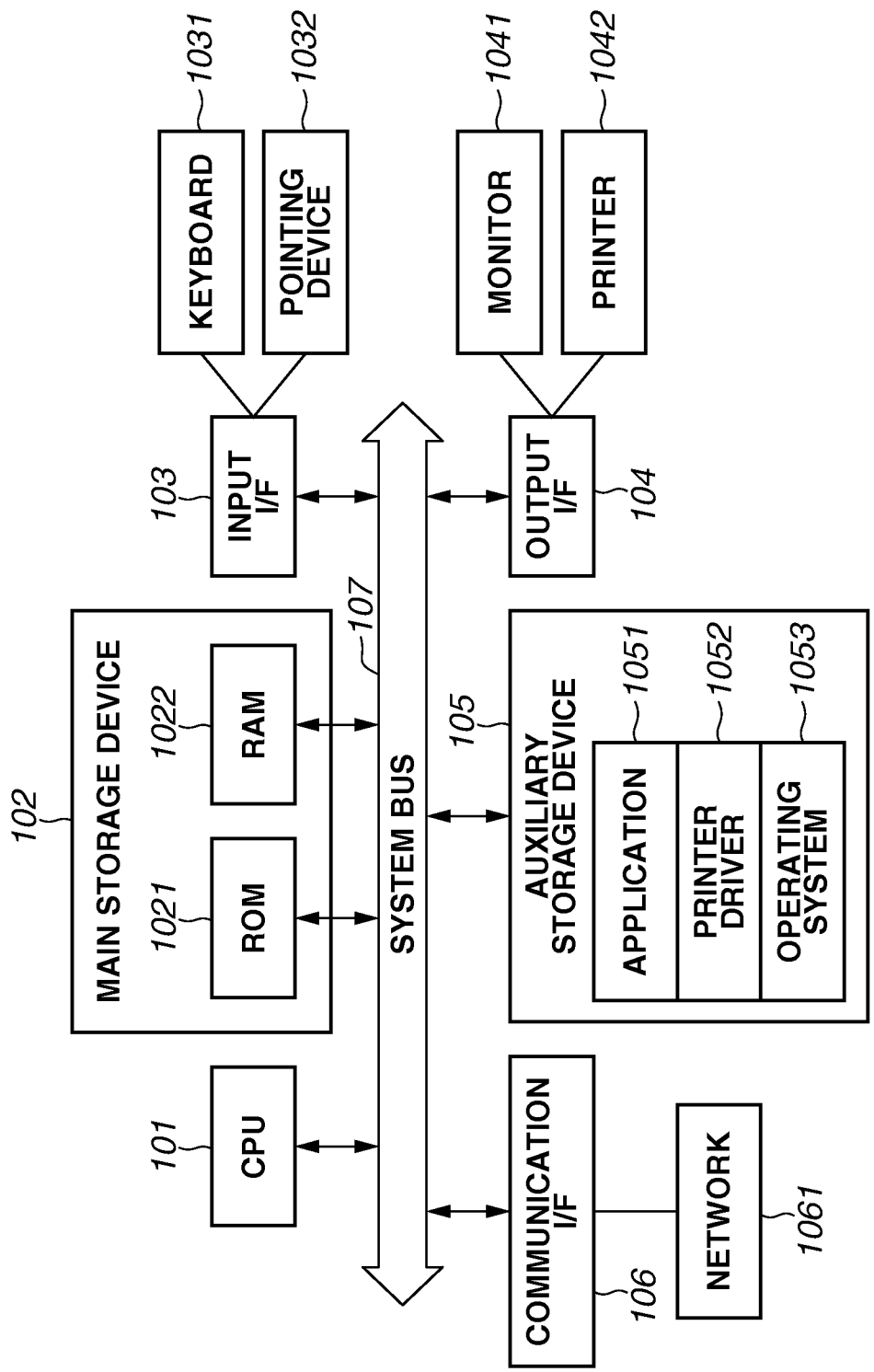
FIG. 1 is a block diagram illustrating an example of a configuration of hardware and software.

FIG. 1 is a block configuration diagram of a system using a general information processing apparatus (computer), according to a first exemplary embodiment of the present invention. It is a matter of course that the present invention can be applied to a single function, a system including a plurality of devices, and a system connected through a network to perform processing, as long as the functions of an exemplary embodiment can be executed, unless otherwise noted.

A central processing unit (CPU) 101 controls the entire information processing apparatus, in accordance with a program stored in a read only memory (ROM) 1021 or a random access memory (RAM) 1022 of a main storage device 102, or in an auxiliary storage device 105. The RAM 1022 is also used as a work area for the CPU 101 to execute various types of processing. The auxiliary storage device 105 stores application software 1051 an operating system 1053, and the like. Input devices, such as a keyboard 1031 and a pointing device 1032, typically a mouse or a touch panel, are devices used by a user to give various instructions to the computer through an input I/F 103. An output I/F 104 is an interface for outputting data to the outside, and outputs the data to an output device such as a monitor 1041 and a printer 1042. The output I/F 104 may be connected to the printer 1042 not only through a local I/O for direct connection, but also through a network 1061 connected through a communication I/F 106. A common data system bus 107 is in charge of data exchange between I/Fs and modules. Steps in flowcharts of the present invention are implemented as the CPU 101 reads out and executes a program related to the flowchart from a memory. The printer 1042 may be a printing device only having a printing function, a fax machine only having a fax function, or may be a multifunction peripheral having a plurality of functions such as a scanning function and the printing function. The printer 1042 is sometimes referred to as an image processing apparatus.

Figure 2:
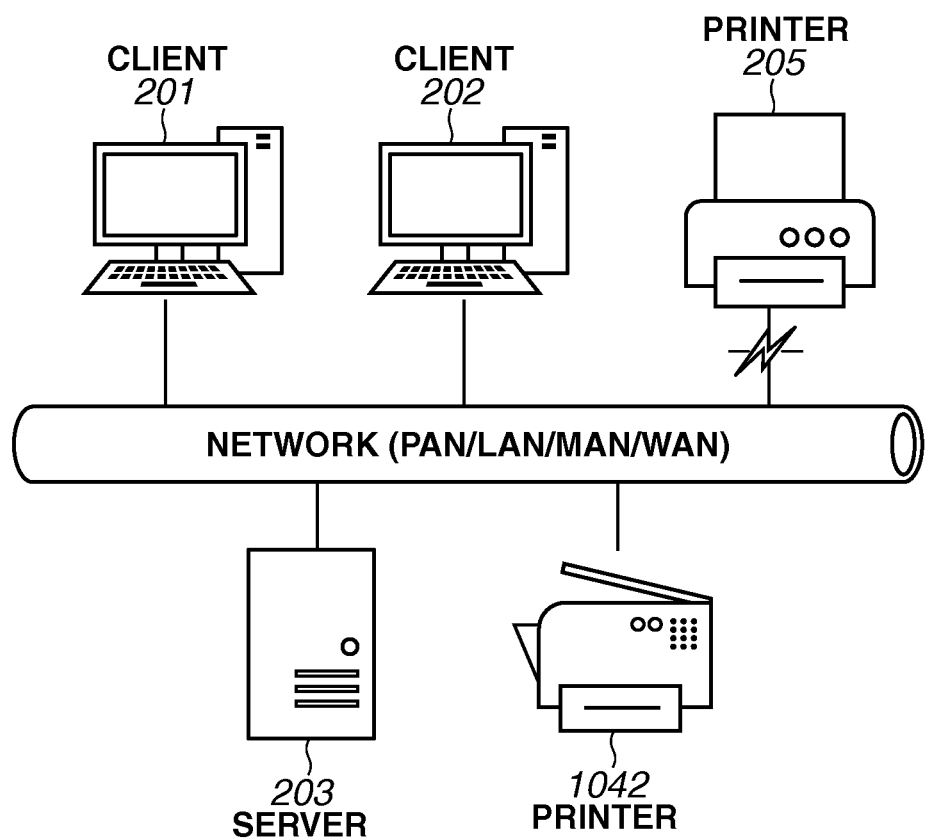
FIG. 2 is a diagram illustrating an example of a configuration of a network.

FIG. 2 is a diagram schematically illustrating an environment of the network 1061 in an exemplary embodiment of the present invention.

One or a plurality of client computers 201/202 that generates a document or an image to be printed is communicably connected through the network 1061. Furthermore, a server computer 203 that manages a user of the client computer 201/202 and the printer 1042 may be connected. One of a plurality of printers 205 and 1042 is connected to the network 1061. In FIG. 2, the printer 205 is illustrated as being in the offline state, that is, the printer 205 is physically connected to the network 1061 but cannot be used.

The network 1061 includes small and large networks such as a personal area network (PAN), a local area network (LAN), a metropolitan area network (MAN), and a wide area network (WAN), and the devices are connected to all the networks. Furthermore, the cloud and the like may be used, so that the server 203 and the printer 205/1042 are connected over the Internet. The client computer 201/202 is sometimes simply referred to as an information processing apparatus. As described above, the information processing apparatus is connectable to other apparatuses (e.g., the image processing apparatus such as a printer, for example). A printer driver 1052 and a device application described later can operate on the information processing apparatus.

Figure 3:
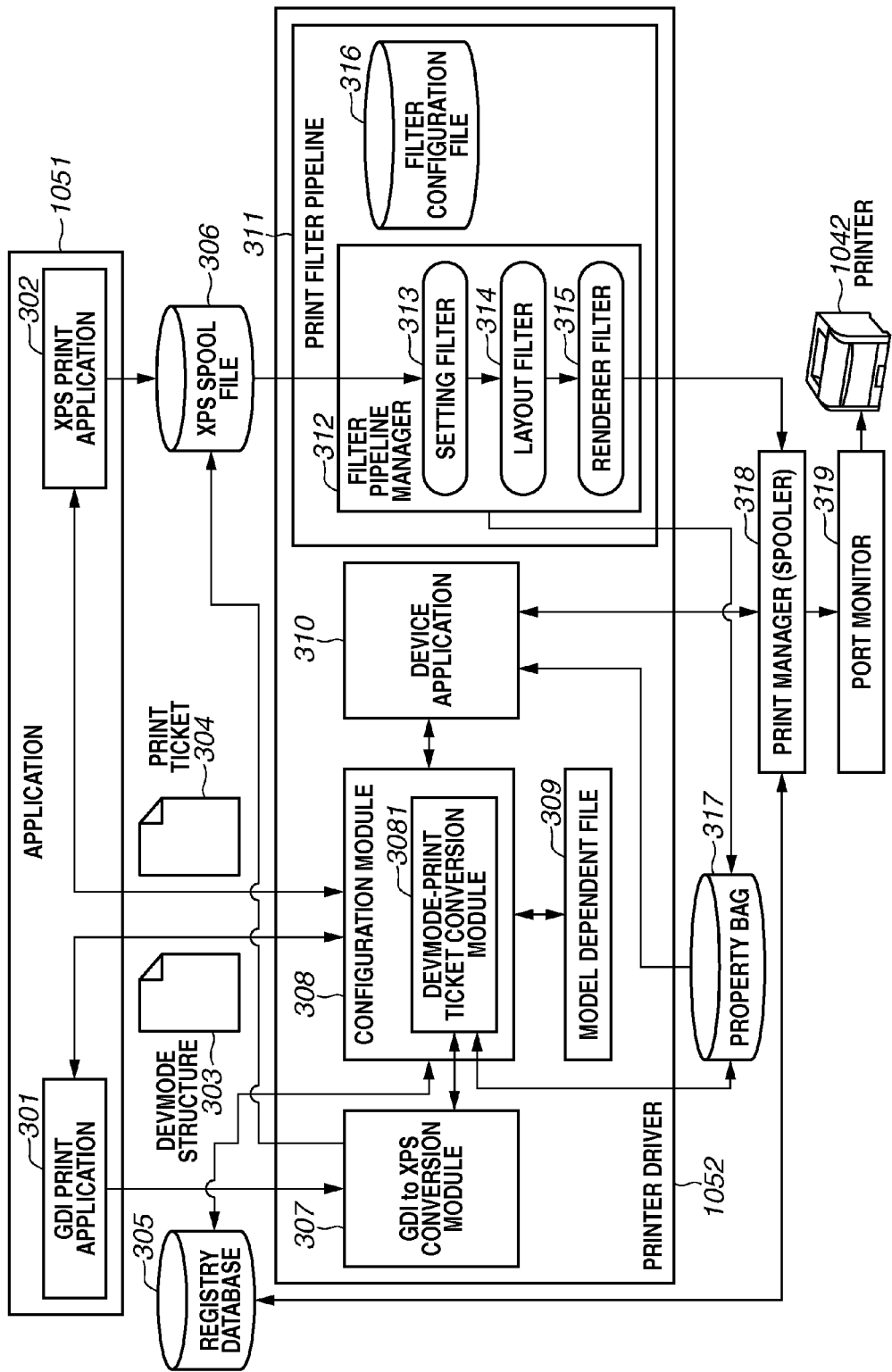
FIG. 3 is a block diagram illustrating an example of a configuration of a print processing system.

FIG. 3 is a configuration block diagram of a v4 printer driver printing system. The v4 printer driver printing system executes printing by using a file format called an XML Paper Specification (hereinafter, abbreviated as XPS) as spool data. The v4 printer driver printing system operates on the operating system 1053.

The operating system 1053 includes modules such as a print manager 318, a Graphics Device Interface (GDI) to XPS conversion module 307, and a filter pipeline manager 312. The GDI to XPS conversion module 307 and the filter pipeline manager 312, which are included in the printer driver 1052, are modules dedicated to the printer driver 1052 and is provided from the operating system 1053.

The printer driver 1052, filters 313 to 315 of the filter pipeline manager 312, and a device application 310 are stored as the printer driver 1052 in the auxiliary storage device 105 in FIG. 1. The device application 310 is installed in conjunction with the installing of the printer driver 1052. The device application 310 can manage a plurality of peripheral devices allocated with different IP addresses, for example. Now, how the printer driver 1052 and the device application 310 are installed will be described. The operating system 1053 installs the printer driver 1052 when, for example, a user issues an instruction or a printer is detected, and generates a print queue. The printer driver 1052 is acquired from a storage medium such as a CD-ROM inserted in the client computer 201/202, a storage device of the server computer 203 connected through the LAN, a cloud server through the Internet, or the like.

The operating system 1053 searches in the storage device in the client computer 201/202 to check if the storage device stores a device management system, associated with the printer corresponding to the installed printer driver 1052. When the result of the searching indicates that the device management system is not stored, the operating system 1053 acquires and installs the device management system. The device management system is acquired from a storage medium such as a CD-ROM inserted in the client computer 201/202, a storage device of the server computer 203 connected through the LAN, or a cloud server through the Internet, or the like. When the device management system is acquired, a device management control file is also acquired. Information related to the printer, the device management system, and the device application 310 is described in the device management control file.

The operating system 1053 terminates the install processing when the device management control file has no description related to the device application 310.

When the device management control file has the description related to the device application 310, the operating system 1053 searches in the storage device to check if the client computer 201/202 includes the device application 310 described in the device management control file.

When the result of the searching indicates that the corresponding device application 310 is not included, the operating system 1053 acquires and installs corresponding device application 310. The device application 310 is acquired from a storage medium such as a CD-ROM inserted in the client computer 201/202, the storage device of the server computer 203 connected through the LAN, or a cloud server through the Internet, or the like.

The installed device application 310 is displayed in a form of a tile. Through the operations described above, the device application 310 is installed in conjunction with the installing of the printer driver 1052.

The device management system has a function of managing the print queue, but cannot manage print queues of a plurality of printers allocated with different IP addresses, for example.

A GDI print application 301 and an XPS print application 302 are stored as an application 1051 in the auxiliary storage device 105 in FIG. 1. The GDI print application 301 executes printing by using a GDI prepared by the operating system 1053. The XPS print application 302 directly uses an XPS spool file 306 to execute printing. The user uses an input device such as the keyboard 1031 and the touch panel/mouse 1032 to issue an instruction for the printing processing through a user interface of the GDI print application 301 or the XPS print application 302 displayed on a monitor 1041 as the output device. The print processing is implemented by executing three processes of "select printer", "generate print setting data", and "convert rendering data" in this order. The flow of the print processing is described below.

First, the user selects the printer 1042 to be used for the printing. To the user, selecting the printer 1042 is equivalent to selecting the printer driver 1052 corresponding to the printer 1042.

Next, the print setting data is generated. When the print setting data is generated, the application 1051 secures a memory area for the print setting data in the RAM 1022. Then, the application 1051 calls a configuration module 308 of the printer driver 1052, to generate and then store the print setting data. In the GDI print application 301, a binary DEVMODE structure 303 is used as the print setting data. In the XPS print application 302, a print ticket 304 written in XML as a mark-up language is used as the print setting data. The DEVMODE structure 303 includes a standard area defined by the operating system 1053 and an extended area uniquely defined by the printer driver 1052. The print ticket 304 is the print setting data written in the XML format, and the standard area and the extended area have name spaces differently written. The print setting data includes information unique to each model, and thus the configuration module 308 uses a model dependent file 309 to generate the print setting data. The content of the print setting data is changed when the application 1051 rewrites the content of the DEVMODE structure 303 or the print ticket 304. The specification of the standard area of the print setting data is disclosed, and thus can be directly changed by the application 1051. Only the printer driver 1052 knows the detail specification of the extended area unique to the printer 1042. Thus, the extended area is set by the user by using the user interface of the device application 310.

The device application 310 is one type of the printer driver 1052, but is installed as a program different from the printer driver 1052. The device application 310 exchanges the print setting data with the printer driver 1052, by using the print ticket 304. The printer driver 1052 changes the setting unique to the printer 1042 in the DEVMODE structure 303 or the print ticket 304, in accordance with the setting of the user interface. The print setting data includes setting values required for the printing such as information about an output sheet size ("A4" for example), as well as settings to perform two-sided printing, color or monochrome printing, and about the paper feed stage. The setting values of the print ticket 304 are written in the XML format, and thus the XPS print application 302 can directly change and thus rewrite all the setting values. However, the extended area is uniquely defined and thus the detail specification is unknown. The specification of the extended area differs between the printers 1042, and thus setting values can be more easily changed by using the user interface of the device application 310. The print setting data is required and thus is generated each time a document is printed. The printer driver 1052 stores option components of the printer 1042 and an environmental setting of each user in a registry data base 305 or a property bag 317 of the operating system 1053. The print manager 318 of the operating system 1053 stores the default values of the print setting data in the registry data base 305. The registry data base 305 and the property bag 317 are stored in the auxiliary storage device 105.

As the final step, the rendering data is converted. When the print setting data is finalized, the user instructs the print processing through the application 1051. When the printing is performed through the GDI print application 301, the rendering data is sent to the GDI to XPS conversion module 307, and the XPS spool file 306 is generated. At that time, the GDI to XPS conversion module 307 calls the configuration module 308 and converts the print setting data into the print ticket 304 from the DEVMODE structure 303, with a DEVMODE-print ticket conversion module 3081. The DEVMODE-print ticket conversion module 3081 can read and write information from and to the property bag 317, and thus can refer to and change the data stored by the device application 310. When the printing is performed through the XPS print application 302, the XPS file may be generated by the XPS print application 302 itself or may be generated by the operating system 1053 in response to a rendering command from the XPS print application 302. By either way, the XPS spool file 306 is generated while the printing is in process.

As described above, the feature of the v4 printer driver printing system is that the XPS spool file 306 based on the rendering data is generated every time the printing is executed. Once the XPS spool file 306 is generated, the print filter pipeline 311 takes over the processing. In the print filter pipeline 311, the printing is executed through a plurality of filters. A filter configuration file 316 controls the number and order of filters. A filter pipeline manager 312, operating in the print filter pipeline 311, performs processing of a setting filter 313, a layout filter 314, and a renderer filter 315, in this order in this embodiment, in accordance with the filter configuration file 316. The number and types of filters change in accordance with the configuration of the printer driver 1052. For example, an encryption filter for encrypting a print job and a preview filter for displaying a preview screen may be further provided in addition to the three filters in FIG. 3.

The print processing is executed by the filters receiving the XPS spool file 306, and proceeds as each filter processes the XPS spool file 306 and then transmits the resultant XPS spool file 306 to the next filter. The XPS spool file 306 is finally converted into the print job to be output to the printer 1042. The printer 1042 can interpret the print job, and thus executes the print processing based on the print job by interpreting the print job. It is a matter of course that when the printer 1042 has an XPS direct print function, and thus can read the XPS spool file 306 and execute printing, the XPS print application 302 may ignore all the filters and directly send the XPS spool file 306 to the printer 1042 to execute the printing. The filter may store the unique data in the property bag 317. The filter can also acquire the information about the operating system 1053 and the data about the other filters from the property bag 317. The setting filter 313 reads the print ticket 304 and writes the data required for the printing in the print ticket 304. The layout filter 314 executes processing related to a layout such as changing of magnitude, and imposition layout and stamp of bookbinding. The layout filter 314 operates in accordance with the print ticket 304 included in the XPS spool file 306. Thus, when there is no imposition setting in the print ticket 304 for example, the layout filter 314 directly transmits the XPS spool file 306 to the next filter without performing any operations. The renderer filter 315, as the last filter, renders the XPS spool file 306 to be converted into a page description language (hereinafter, abbreviated as PDL). The renderer filter 315 converts the print setting data of the print ticket 304 into a printer job language (hereinafter, abbreviated as PJL). The renderer filter 315 collectively sends the PDL and the PJL to the filter pipeline manager 312, as the print job. The print job is sent to the print manager 318 that performs schedule management of the print processing. Thus, the print job is sequentially registered in a queue (waiting queue). The print manager 318 sends the print job through a port monitor 319 in the registered order in the queue, each time the printer 1042 becomes available to print.

Thus, the main job of the printer driver 1052 is to convert the rendering data and the print setting data into the print job, so that the printing in the information processing apparatus is executed.

In the present exemplary embodiment, the printer driver 1052 is described because the print processing is used for the description. The present exemplary embodiment can be also applied to fax transmission processing. In this case, the renderer file 315 serves as a driver that generates fax data and transmits the fax data to a fax machine.

Figure 4:
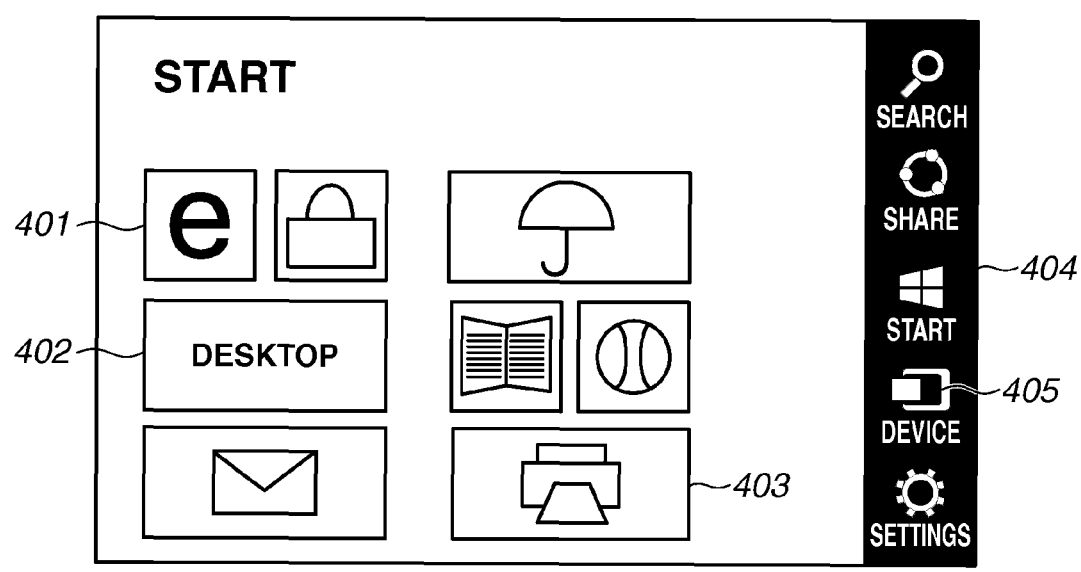
FIG. 4 is a diagram illustrating an example of a start menu of an operating system (OS).

When the user starts the computer and logs in, a shell that displays the user interface of the operating system 1053 is started, and the start screen in FIG. 4 is displayed. The shell is a module of the operating system 1053, and operates to display the start screen, a system menu, and the like. Tiles 401 for starting the applications 1051 are arranged in the start screen. When the user taps or clicks the tile 401, the operating system 1053 starts the application 1051. Most of the applications 1051 to be started are optimized for the touch panel in full-screen display, and are the XPS print application 302. The GDI print application 301 is started from a desktop screen displayed when the user taps or clicks a desktop tile 402. It is a matter of course that the GDI print application 301 can be registered as a tile on the start screen. The device application 310 is registered as a tile 403. Thus, the user can also start the device application 310 by tapping or clicking the tile 403.

The operating system 1053 includes a system menu 404. The system menu 404 provides a function common to the applications 1051. For example, the user can instruct the printing from the application 1051 by tapping device 405.

Secure print is one example of the print processing requiring a PIN code (also referred to as a password). When the secure print is designated, the printer driver 1052 generates a print job with a password, and transmits the print job to the printer. The printer stores the print job with the password. The printing is executed when the user selects the stored print job, using the operation panel of the image processing apparatus, and inputs the correct password. A department management function is another example of the print processing requiring the PIN code. The department management function is used when a dedicated password is prepared for each department of a company, to manage fees and the number of printed sheets. Furthermore, in some cases, the print job is provided with a password for user authentication registered in the printer, and a password for canceling the encrypted print job.

The procedure of generating the print job in the present exemplary embodiment will be described referring to a sequence diagram in FIG. 5 and a flowchart in FIG. 9.

FIG. 5 is the sequence diagram illustrating a flow of processing up to a point where the printing is started by the user using the application 1051.

First, the user taps the tile 401 of the application 1051 displayed on the start screen in step S501. When the tile 401 is tapped, the shell of the operating system 1053 starts the application 1051 corresponding to the tapped tile 401 in step S502. The application 1051 started in step S502 is the XPS print application 302.

In step S503, the user displays a document to be printed using the XPS print application 302, opens the system menu 404, and taps the device 405. In response to the operation in step S503, the shell of the operating system 1053 requests the XPS print application 302 to transmit the rendering data for the printing in step S504. When the XPS print application 302 transmits the rendering data to the operating system 1053, a print dialog of the operating system 1053 is started in step S505. In step S506, the print dialog displays a list of printable printers registered in the operating system 1053. The print dialog is a module of the operating system 1053, and displays the information on printers.

The user selects the printer to be used for the printing from the list of printers by tapping the icon of the printer in step S507. In step S508, the print dialog requests the configuration module 308 of the printer driver 1052 to transmit the capability of the printer selected in step S507 and the default print setting data.

The configuration module 308 of the printer driver 1052 returns the capability of the printer and the default print setting data to the print dialog in step S509. The default print setting data acquired by the print dialog in step S509 is in a form of the print ticket 304.

The print dialog transmits the print ticket 304 as the print setting data to the XPS print application 302, and requests the XPS print application 302 to generate the preview image of the rendering data of the target of the printing in step S510. The XPS print application 302 reads the received print ticket 304 and interprets the setting values, generates the preview image corresponding to the setting values, and returns the resultant image to the print dialog in step S511.

Figure 6:
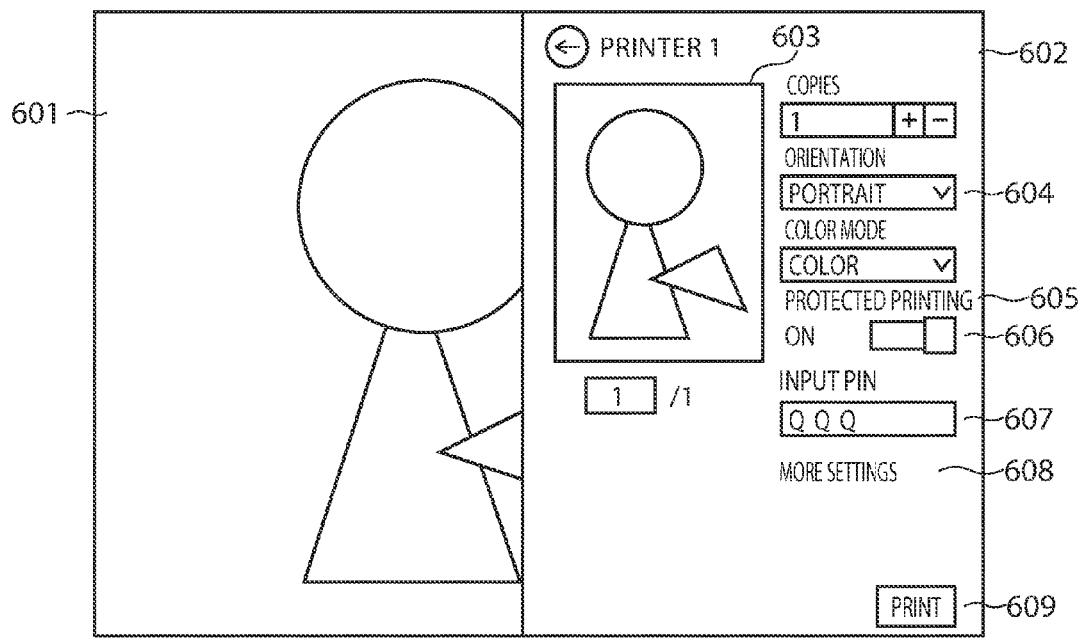
FIG. 6 is a diagram illustrating an example of a print dialog displayed by an application.

FIG. 6 illustrates a screen displayed through the operations in steps S511. The document to be printed by the XPS print application 302 is displayed in an area 601. A setting screen 602 of the print dialog is displayed on the right side of the screen of the XPS print application 302. The preview image 603 of the rendering data of the target of the printing received from the XPS print application 302 is displayed on the screen 602 of the print dialog.

A control 604 is displayed on the screen 602 of the print dialog, so that the print setting values can be changed in accordance with the capability of the printer received from the configuration module 308. The control 604 includes items of the print setting and choices. For example, when the user selects an arrow of the control 604, portrait and landscape are displayed as the choices for the orientation of printing.

The screen 602 of the print dialog displays an item of the standard area from the print setting data using the control 604. The XPS print application 302 can select the function of the standard area displayed in the setting item. When the printer driver 1052 supports the PIN printing, the function of protected printing 605 is displayed. Whether the printer driver 1052 supports the PIN printing is determined based on the capability of the printer driver 1052 acquired in step S509. The protected printing 605 can be switched between activated and deactivated by turning ON and OFF a switch 606. When the switch 606 is turned ON, a PIN input control 607 is displayed. The input control 607 may be changed from a grayed out display state in capable of receiving the setting, to a display state capable of receiving the setting. A password is input to the PIN input control 607. The password in a form of the PIN cord is held in the print ticket 304. When the switch 606 is turned ON, a print button 609 is grayed out and cannot be pressed, until the password is entered. Thus, the user can be forced to input the password before instructing the printing by using the print button 609 of the screen 602 of the print dialog.

When the user taps and selects "more settings" in step S512, the print dialog starts the device application 310 associated with the printer driver 1052 in step S513.

The device application 310 requests the configuration module 308 to transmit the capability of the printer and the print setting data in step S514. The configuration module 308 returns the capability of the printer and the print setting data to the device application 310 in step S515.

Figure 7:
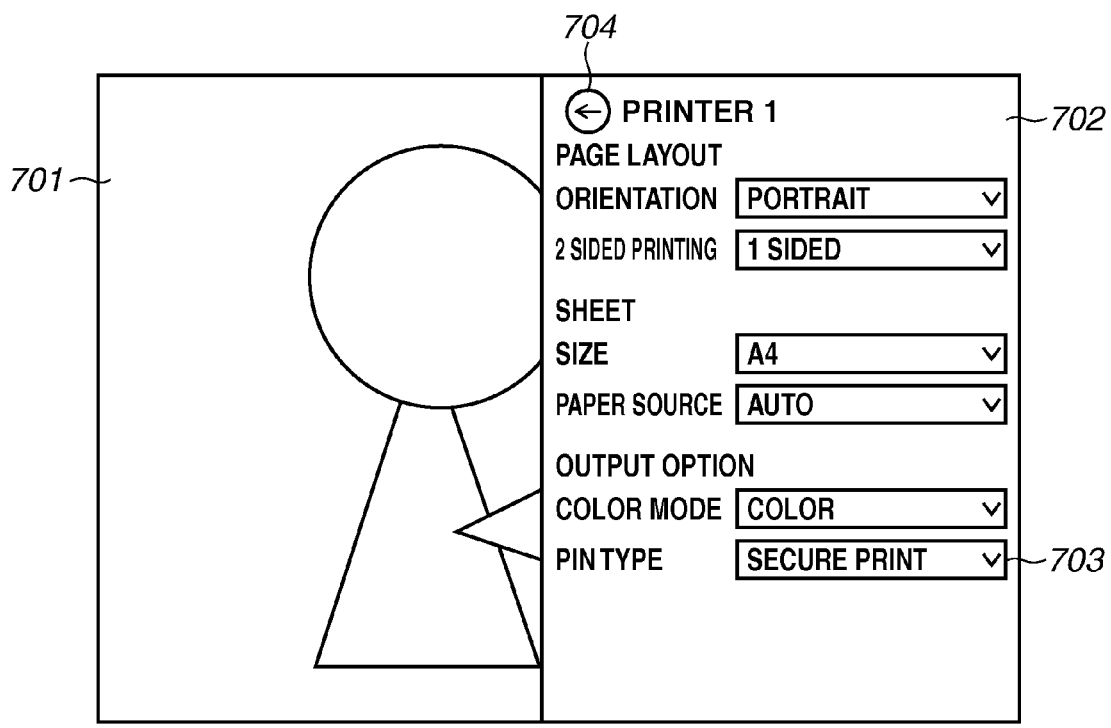
FIG. 7 is a diagram illustrating an example of a screen of a device application.

FIG. 7 illustrates a screen displayed by the device application 310 by using the capability of the printer and the print setting data acquired in step S515.

Figure 11:
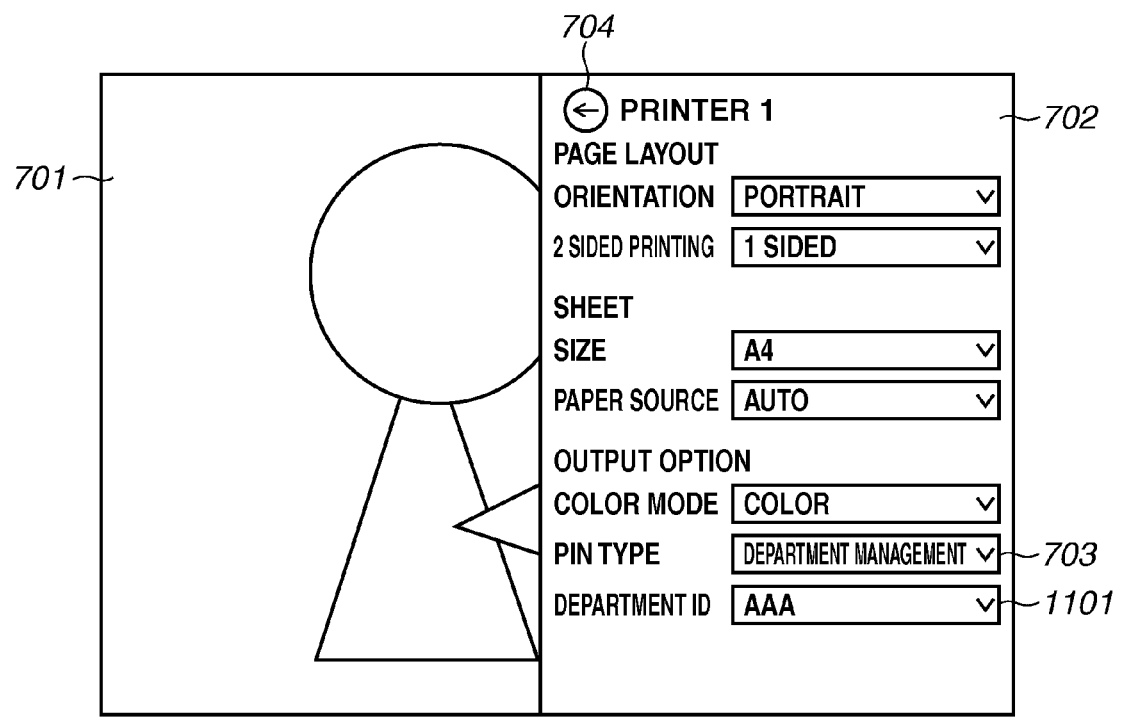
FIG. 11 is a diagram illustrating an example of a screen of the device application.

The document to be printed by the XPS print application 302 is displayed at the same position 701 as the same position in FIG. 6. A user interface (setting screen) 702 of the device application 310 is displayed at the position where the screen 602 of the print dialog has been displayed. Unlike the print dialog, the device application 310 is a part of the printer driver 1052, and thus can access the item for setting an extended area of the print setting data. The device application 310 displays a control, with which the print setting values of the setting items of the standard area and the extended area can be changed in accordance with the capability of the printer. In FIG. 7, a control 703 for selecting a PIN type is displayed as the setting item of the extended area. The PIN type receives the selected purpose of using the PIN code in the PIN input 607 of the protected printing 605 from the user. FIG. 7 illustrates an example case where "secure print" is selected as the PIN type. When "department management" is selected as the PIN type, the screen in FIG. 11 is displayed. The difference from FIG. 7 is that a control 1101 for inputting "department ID" is displayed, because "department ID" needs to be input when the "department management" is selected.

Now, a flow of operation for inputting the PIN type of the device application 310 will be described referring to the flowchart in FIG. 9. The flowchart starts after the user inputs the PIN type using the control 703 for the PIN type in FIG. 7 in step S516 in the sequence diagram of FIG. 5.

First, the device application 310 acquires the print ticket 304 in step S901. Then, the device application 310 determines whether the purpose of using the password set by using the control 703 of the PIN type is the secure print, in step S902. When the purpose of using the password is the secure print, the device application 310 determines whether a PIN code of the print ticket 304, i.e., a password of the print ticket 304 is written, in step S903. When the PIN code has been written already, the device application 310 deletes the PIN code of the print ticket 304 in step S904. In the secure print, the password should be attached to each print job, and the password of the prior print job should not be reused. Thus, when the PIN type is used for the secure print, the password is deleted to force the user to input a password before issuing the print instruction. Specifically, for example, an application that issues a print instruction might have a function of generating a new print ticket by using a print ticket of a print job used in the prior printing. The password used in the prior printing is written in the print ticket generated by such an application, and thus the password of the prior print job is reused. Thus, the processing in step S904 is executed to prevent the password from being reused. Furthermore, the user might touch "more settings" 608 after inputting the PIN code with no intension to use the PIN code for the secure print in FIG. 6. If the secure print is selected as the PIN type in the display illustrated in FIG. 7, the PIN code input by the user with no intension to use the PIN code for the secure print is used for the secure print. Thus, the PIN code, not intended by the user to be used for the secure print, can be prevented from being used for the secure print by executing the processing in step S904.

The device application 310 does not execute any operation when no PIN code is written in the print ticket 304. simply sets the PIN type of the print ticket 304 to the secure print in step S905. Then the device application 310 sets the PIN type to the secure print in step S905. Specifically, the processing in step S905 is executed when the device application 310 writes the secure print in the print ticket 304, as the PIN type.

The device application 310 determines whether the PIN type is set to the department management in step S906, when the PIN type is not set to the secure print. When the PIN type is set to the department management (Yes in step S906), the device application 310 checks if the password for the department management is stored in the property bag 317 in step S907. When the password for the department management is stored (Yes in step S907), the device application 310 overwrites the PIN code of the print ticket 304 with the stored password for the department management in step S908. The PIN code that has been written in the print ticket 304 is overwritten, and thus is deleted. When no password for the department management is stored in the property bag 317 (No in step S907), the device application 310 maintains the PIN code of the print ticket 304 without performing any particular processing. Then, the device application 310 sets the PIN type of the print ticket 304 to the department management in step S909. When the department management is selected as the PIN type, the device application 310 determines whether a department ID is stored in the property bag 317. When the department ID is stored, the device application 310 writes the stored department ID in the print ticket 304. When a new department ID is set with the control 1101 for the department ID in FIG. 11, the new department ID is written in the print ticket 304.

When the PIN type is set to neither the secure print nor the department management (No in step S906), the device application 310 maintains the PIN code of the print ticket 304 in step S910. In step S911, the device application 310 writes the PIN type of the print ticket 304, in accordance with the type of control selected by the user. The PIN type that is neither the secure print nor the department management includes fax transmission, for example. When the fax transmission is selected as the PIN type, the input PIN code is written in the print ticket 304, as the fax number.

As the final step, the device application 310 sets the print ticket 304 in the configuration module 308, as the print setting data in step S912. Thus, the PIN type is set in the print setting data in step S517.

When the print setting processing using the user interface 702 of the device application 310 is completed, the user presses a return button 704 to notify the device application 310 that the print setting processing is completed, in step S518. The device application 310 requests the configuration module 308 to verify the print setting values of the print ticket 304 in step S519. The print setting values are verified to check if there is any conflicting set value of the print setting items. If there is a conflicting setting value, the configuration module 308 generates the print ticket 304 with the conflicting setting value corrected. The configuration module 308 returns the print ticket 304 with the conflicting setting value corrected to the device application 310, as the print setting data in step S520. The device application 310 returns the resultant final print setting data to the print dialog in step S521. The print dialog sends the current print ticket 304 to the configuration module 308 to verify the print setting in step S521-1. The configuration module 308 returns the capability, obtained by writing the selected PIN type as the display name of the protected printing, as the capability of the printer driver 1052 in step S521-2. Through the processing in step S521-2, the print dialog displays the PIN type selected by the user on "protected printing" in FIG. 6. For example, when the user selects "secure print" as the PIN type in FIG. 7, "secure print" is displayed instead of "protected printing 605" in FIG. 6. When the user selects "department management" as the PIN type in FIG. 7, "department management" is displayed instead of "protected printing 605" in FIG. 6.

The user turns ON the switch 606 of the protected printing 605 in the screen 602 of the print dialog in step S522, to execute the printing using a password. The print dialog writes the information indicating that the protected printing 605 is turned ON, in the print ticket 304, and transmits the resultant print ticket 304 to the configuration module 308. Here, the configuration module 308 only checks the grammar of the print ticket 304, and then returns the print setting data in step S524. When the protected printing 605 is turned ON, the print dialog checks whether the PIN code is input. When there is no password, the print dialog grays out the print button 609 so that the user cannot press the print button 609, to force the user to input the password to execute printing. The print button 609 also grays out when the password is only in the number of digits out of the settable range. The user inputs the PIN code to the PIN input control 607 in step S525. Only numerical values can be input to the PIN input control 607, and the printer driver 1052 can define the minimum and the maximum number of digits of the numerical values, in the model dependent file 309. In the present exemplary embodiment, the PIN type can be selected from a plurality of choices, and thus the minimum and the maximum number of digits applicable to all the selectable functions are defined. The print dialog writes the password input to the PIN input control 607 in FIG. 6, as the PIN code, and transmits the print ticket 304 to the configuration module 308 in step S526. Also in this case, the configuration module 308 checks only the grammar of the print ticket 304, and returns the print setting data in step S527. The print dialog enables the user to press the print button 609, when the correct password is input to the PIN input control 607.

The user taps the print button 609 in the screen 602 of the print dialog, to instruct the initiation of the printing in step S528. The print dialog transmits the print ticket 304, as the current print setting data, to the configuration module 308 to verify the print setting in step S529. Then, the configuration module 308 generates the print ticket 304 with the conflicting setting value corrected, and returns the print setting data in step S530. Then, the print dialog transmits the rendering data and the print setting data to the printer driver 1052 through the filter pipeline manager 312 in step S531. The print dialog transmits the rendering data and the print setting data to the filter pipeline manager 312. The filter pipeline manager 312 transmits the rendering data and the print setting data to the first filter (setting filter 313 in FIG. 3) in the printer driver 1052, and thus the processing of generating the print job in the printer driver 1052 starts.

Figure 9:
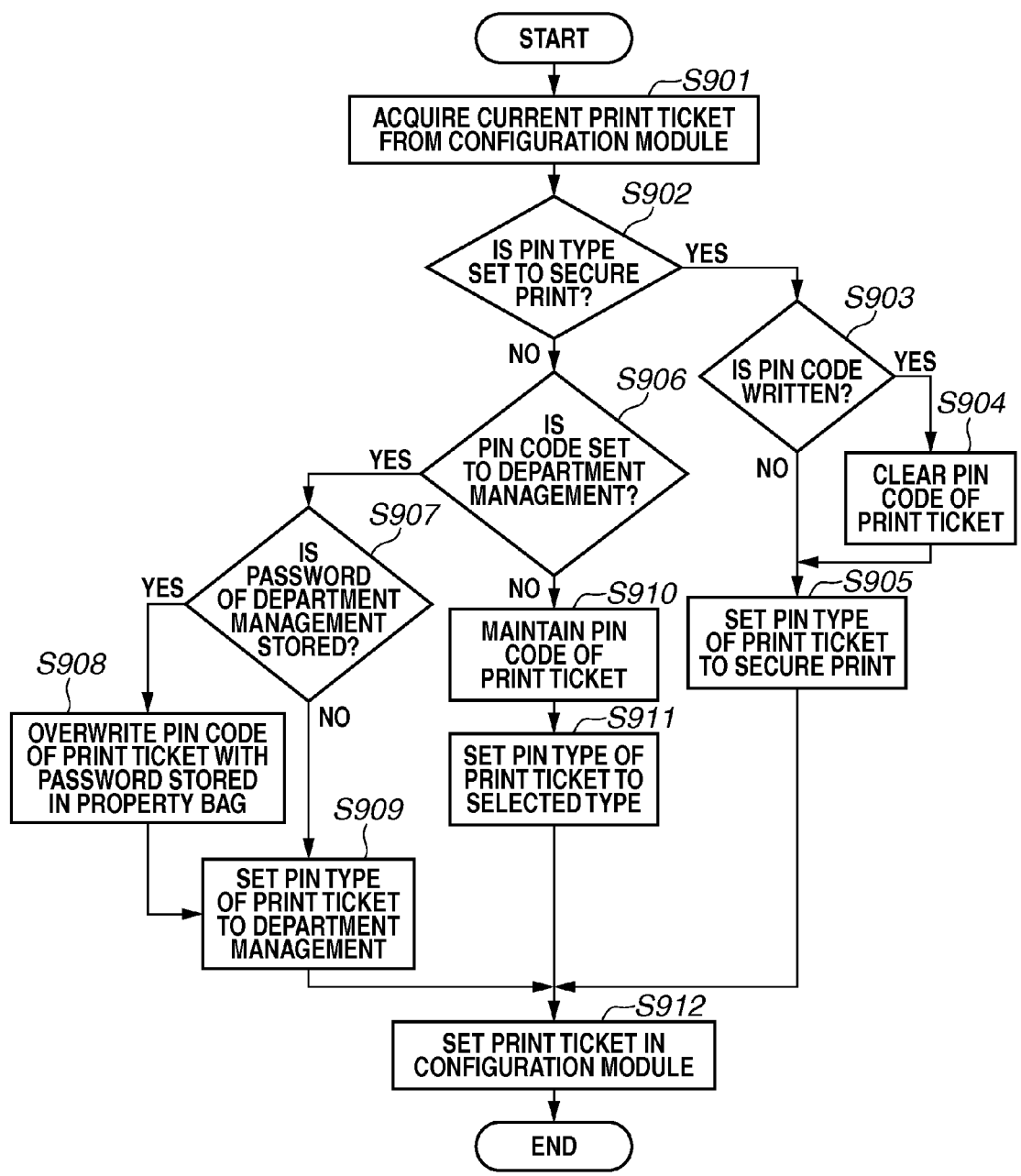
FIG. 9 is a flowchart illustrating processing for switching a Personal Identification Number (PIN) type of the device application.
Figure 10:
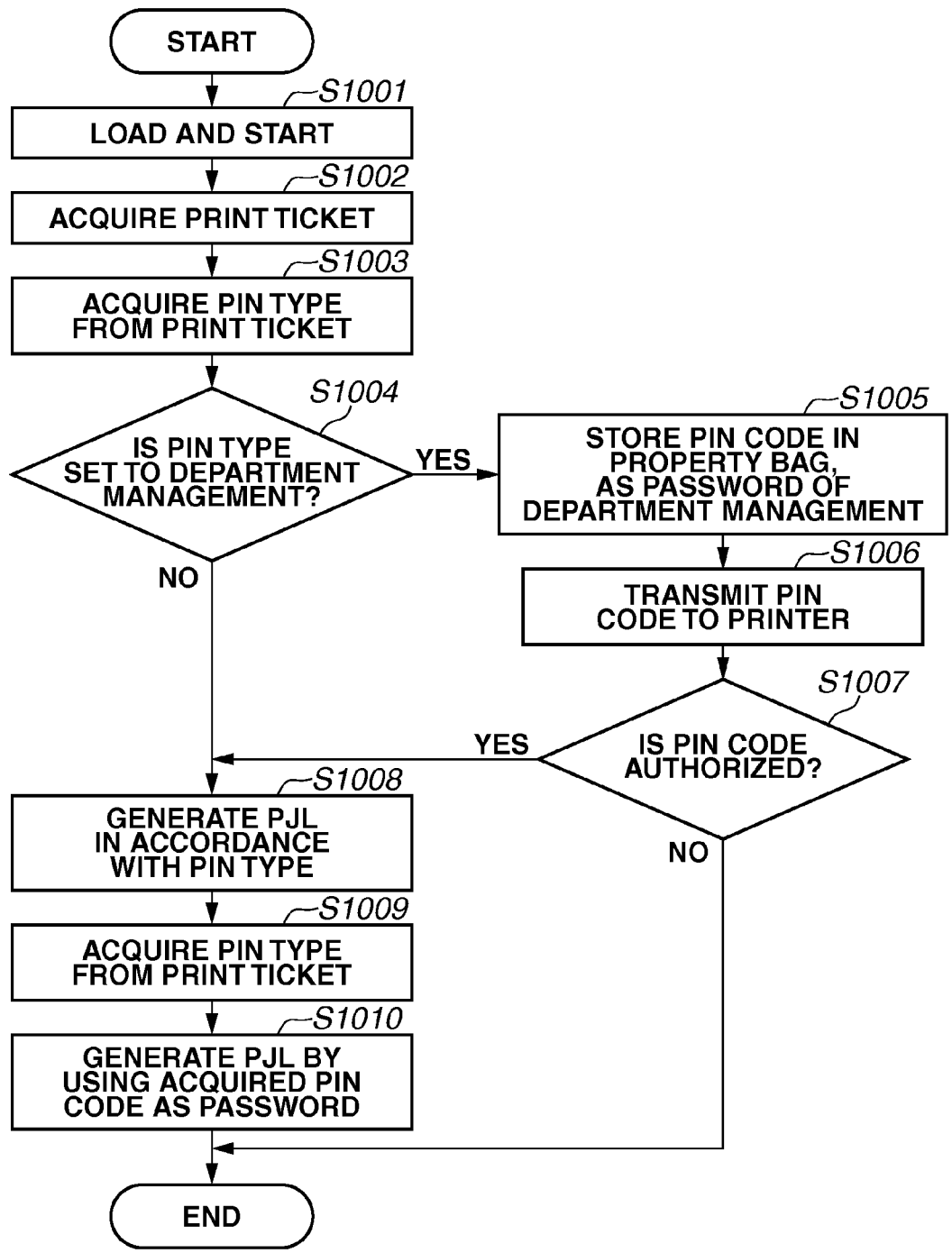
FIG. 10 is a flowchart illustrating PIN code processing in print processing.

As described above, through the sequence processing in FIG. 5 and the processing of the flowchart in FIG. 9, the PIN type and the PIN code (password) are written in the print setting data, and thus the printing starts. Next, the processing of a filter executed as the print processing starts will be described by referring to the flowchart in FIG. 10. The processing in FIG. 10 starts when the print button 609 in FIG. 6 is tapped. FIG. 10 illustrates the processing performed by the renderer filter 315 of the printer driver 1052.

After the print button 609 is tapped in FIG. 6, the filter pipeline manager 312 loads the filter in step S1001. The filter pipeline manager 312 transmits the print ticket 304 as the print setting data and the XPS spool file 306 as the rendering data to the filter. Then, the filter acquires the print ticket 304 to check the print setting required for generating the PJL in step S1002. The filter acquires the PIN type from the print ticket 304, and thus confirms the PIN type in step S1003. When the department management is written as the PIN type, the filter stores the PIN code acquired from the print ticket 304 in the property bag 317, as the password of the department management in step S1005. By thus storing the password, when the PIN type is set to the department management in the subsequent printing, the prior password can be used.

Then, the filter transmits the department ID and the PIN code acquired from the print ticket 304 to the printer 1042 for the department management. The department ID and the password are registered in advance in the printer 1042 for the department management. The printer 1042 determines whether the department ID and the PIN code transmitted in step S1006 have been stored in the printer 1042. When the department ID and the PIN code transmitted in step S1006 have been stored in the printer 1042, the printer 1042 transmits "authentication OK" to the filter. When the department ID and the PIN code transmitted in step S1006 has not been stored in the printer 1042, the printer 1042 transmits "authentication NG". Upon receiving the authentication result from the printer 1042, the filter determines whether the authentication result is "authentication OK" in step S1007. When the authentication result is OK (Yes in step S1007), the processing proceeds to step S1008, and when the authentication result is NG, the filter does not generate the print job, and the processing is terminated.

Next, the filter generates the command for a method for outputting the PJL in accordance with the PIN type in step S1006. For example, the filter writes "department management" as the method for outputting the PJL when the department management is selected as the PIN type, and writes "secure print" as the method for outputting the PJL when the secure print is selected as the PIN type. The filter acquires the PIN code from the print ticket 304 in step S1007. Then, the filter uses the acquired PIN code to generate the password command for the PJL in step S1008. Thus, the filter writes the PIN code as the password of the PJL. When the PJL is generated, the filter converts the rendering data into the PDL command to generate the print job based on the PJL and the PDL. Then, the filter transmits the generated print job to the printer 1042 through the printer manager 318 and the port monitor 319.

Through the processing in FIG. 10, the v4 printer driver system can generate the print job with a password in accordance with the purpose, from the PIN type and the PIN code in the print ticket 304, and transmit the print job to the printer 1042. When the department ID and the password have been transmitted to the printer 1042 in advance in the department management, the print job may be transmitted with the password and the department ID written or unwritten.

Through the processing described above, even in an environment where only one PIN code can be input, the PIN code can be used for various purposes by changing the usage in accordance with the PIN type selected by the user. The different PIN codes can be used for different purposes by forcing the user to input the PIN code or reusing the input values that have been used before depending on the purpose. By using the different PIN codes, the security risk of using the same PIN code for different purposes can be prevented.

In the first exemplary embodiment, the processing of selecting the PIN type by using the user interface of the device application 310 called from the print dialog screen 602 is described. However, in some cases the device application 310 might not be installed. In this case, even when "more setting" 608 in the print dialog of FIG. 6 is tapped, the screen 602 in FIG. 6 is not displayed, and only the standard print setting items generated by the print dialog are displayed. Thus, the user cannot select the PIN type.

Figure 8:
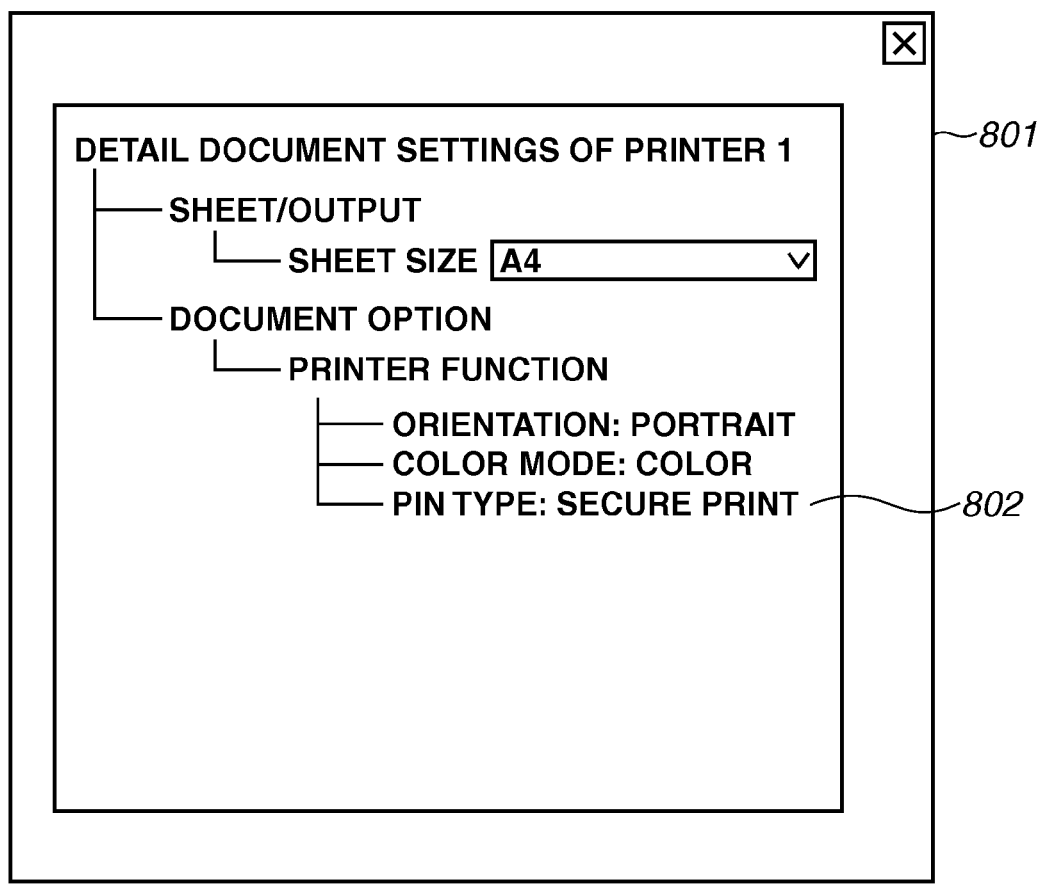
FIG. 8 is a diagram illustrating a user interface of a printer driver of a desktop.

In this case, the PIN type is selected by using a detail setting UI 801 in FIG. 8 as a desktop UI of the printer driver 1052 in the desktop screen displayed when the desktop tile 402 in the start screen in FIG. 4 is tapped. The configuration module 308 of the printer driver 1052 receives the setting information of model dependent functions from the model dependent file 309, and thus sets up the detail setting UI 801 of the desktop screen. Thus, the detail setting UI 801 includes a control 802 allowing the user to set the PIN type, which is not provided to the print dialog. The PIN type 802 is set using the detail setting UI 801 in the desktop screen, and the set PIN type is stored as a default value of the print setting data. Since the PIN type is set as the default value, the user can select the desired PIN type without performing the operations in steps S512, S516, and S518 in the sequence processing in FIG. 5. When the department management is set as the PIN type in FIG. 8, the department ID cannot be input due to the absence of the device application 310. Thus, the department management may be caused not to be selectable through the selection of the PIN type in FIG. 8. Alternatively, a special application for inputting the department ID may be used to register the department ID in the registry, and the department ID may be read from the registry when the department management is selected as the PIN type in FIG. 8.

The device application 310 that performs the operations of the flowchart in FIG. 9 in the first exemplary embodiment, is not provided in the second exemplary embodiment, and thus cannot perform the processing in FIG. 9. Thus, a script file in the model dependent file 309 called by the DEVMODE-print ticket conversion module 3081 of the configuration module 308 performs the operations of the flowchart in FIG. 9. The script file is called when the configuration module verifies the print setting in steps S519 and S529, and thus performs the operations of the flowchart in FIG. 9 at the called timings to rewrite the print ticket 304. Thus, the same processing as in FIG. 9 is performed by the script file. In the exemplary embodiments, secure print and department management are described as examples. Alternatively, the processing of the exemplary embodiments can be applied to cases where user information is required, such as inputting of an address for fax transmission.

With the exemplary embodiments described above, the print processing can be performed with the password as the user intended.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-146309, filed Jul. 12, 2013, which is hereby incorporated by reference herein in its entirety.

What is claimed is:

1. An information processing apparatus comprising one or more processors coupled via a bus to a memory, the one or more processors being programmed to control:
a first display control unit configured to display a first setting screen provided by an operating system, the first setting screen having only one area for inputting a personal identification code;
a setting unit configured to set the personal identification code via the displayed first setting screen;
a second display control unit configured to display a second setting screen provided by a device application installed in conjunction with installing of a printer driver, the second setting screen being different from the first setting screen and being used for selecting a personal identification code type among plural personal identification code types;
a selection unit configured to select, as the personal identification code type, one personal identification code type among the plural personal identification code types via the displayed second setting screen, wherein the selected personal identification code type is displayed on the first setting screen after the personal identification code type is selected via the second setting screen;
a generation unit configured to generate a print job in which the personal identification code set via the displayed first setting screen is used in accordance with the personal identification code type selected via the displayed second setting screen; and
a transmitting unit configured to transmit the generated print job to an image forming apparatus,
wherein the personal identification code is used as a password, and the personal identification code type indicates a purpose for using the password.

2. The information processing apparatus according to claim 1, wherein the second setting screen is displayed before the personal identification code is set via the first setting screen.

3. The information processing apparatus according to claim 1, wherein the personal identification code type is secure print or department management.

4. The information processing apparatus according to claim 1, wherein each personal identification code type of the plural personal identification code types is a personal identification code type for which the personal identification code is used as part of generating the print job.

5. The information processing apparatus according to claim 1,
wherein the plural personal identification code types include, at least, any two of the following personal identification code types:
secure printing;
department management; and
user authentication.

6. The information processing apparatus according to claim 5, wherein the generation unit is configured to:
acquire a print ticket;
determine from the print ticket which personal identification code type was selected via the displayed second setting screen;
in response to determining that secure printing was selected as the personal identification code type:
determine whether the personal identification code has been written in the print ticket;
delete the personal identification code in response to determining that the personal identification code has been written; and
set the personal identification code type of the print ticket to secure printing;
in response to determining that department management was selected as the personal identification code type:
determine whether a department manager personal identification code is stored in a property bag;
overwrite the personal identification code with the department manager personal identification code in response to determining that the department manager personal identification code is stored in the property bag;
maintain the personal identification code in response to determining that the department manager personal identification code is not stored in the property bag; and
set the personal identification code type of the print ticket to department manager; and
in response to determining that user authentication was selected as the personal identification code type:
maintain the personal identification code; and
set the personal identification code type of the print ticket to user authentication.

7. A control method executed in an information processing apparatus, the control method comprising:

displaying, using a processor, a first setting screen provided by an operating system, the first setting screen having only one area for inputting a personal identification code;

setting, using the processor, the personal identification code via the displayed first setting screen displaying, using the processor, a second setting screen provided by a device application installed in conjunction with installing of a printer driver, the second setting screen being different from the first setting screen and being used for selecting a personal identification code type among plural personal identification code types;

selecting, using the processor, as the personal identification code type of the personal identification code, one personal identification code type among the plural personal identification code types via the displayed second setting screen;

displaying the selected personal identification code type on the first setting screen after the personal identification code type is selected via the second setting screen;

generating, using the processor, a print job in which the personal identification code set via the displayed first setting screen is used in accordance with the personal identification code type selected via the displayed second setting screen; and transmitting, using the processor, the generated print job to an image forming apparatus, wherein the personal identification code is used as a password, and the personal identification code type indicates a purpose for using the password.

8. The control method according to claim 7, wherein each personal identification code type of the plural personal identification code types is a personal identification code type for which the personal identification code is used as part of generating the print job.

9. The control method according to claim 7,
wherein the plural personal identification code types include, at least, any two of the following personal identification code types:
secure printing;
department management; and
user authentication.

10. The control method according to claim 9, wherein the generating of the print job comprises:
acquiring a print ticket;
determining from the print ticket which personal identification code type was selected via the displayed second setting screen;
in response to determining that secure printing was selected as the personal identification code type:
determining whether the personal identification code has been written in the print ticket;
deleting the personal identification code in response to determining that the personal identification code has been written; and
setting the personal identification code type of the print ticket to secure printing;
in response to determining that department management was selected as the personal identification code type:
determining whether a department manager personal identification code is stored in a property bag;
overwriting the personal identification code with the department manager personal identification code in response to determining that the department manager personal identification code is stored in the property bag;
maintaining the personal identification code in response to determining that the department manager personal identification code is not stored in the property bag; and
setting the personal identification code type of the print ticket to department manager; and
in response to determining that user authentication was selected as the personal identification code type:
maintaining the personal identification code; and
setting the personal identification code type of the print ticket to user authentication.

11. A non-transitory computer-readable storage medium storing a program for causing a computer to execute a control method, the method comprising:
displaying, using a processor, a first setting screen provided by an operating system, the first setting screen having only one area for inputting a personal identification code;
setting, using the processor, the personal identification code via the displayed first setting screen;
displaying, using the processor, a second setting screen provided by a device application installed in conjunction with installing of a printer driver, the second setting screen being different from the first setting screen and being used for selecting a personal identification code type among plural personal identification code types;
selecting, using the processor, as the personal identification code type of the personal identification code, one personal identification code type among the plural personal identification code types via the displayed second setting screen;
displaying the selected personal identification code type on the first setting screen after the personal identification code type is selected via the second setting screen;
generating, using the processor, a print job in which the personal identification code set via the displayed first setting screen is used in accordance with the personal identification code type selected via the displayed second setting screen; and
transmitting, using the processor, the generated print job to an image forming apparatus,
wherein the personal identification code is used as a password, and the personal identification code type indicates a purpose for using the password.

12. The non-transitory computer-readable storage medium storing the program according to claim 11, wherein the second setting screen is displayed before the personal identification code is set via the first setting screen.

13. The non-transitory computer-readable storage medium storing the program according to claim 11, wherein each personal identification code type of the plural personal identification code types is a personal identification code type for which the personal identification code is used as part of generating the print job.

14. The non-transitory computer-readable storage medium storing the program according to claim 11,
wherein the plural personal identification code types include, at least, any two of the following personal identification code types:
secure printing;
department management; and
user authentication.

15. The non-transitory computer-readable storage medium storing the program according to claim 14, wherein the generating of the print job comprises:
acquiring a print ticket;
determining from the print ticket which personal identification code type was selected via the displayed second setting screen;

in response to determining that secure printing was selected as the personal identification code type:
- determining whether the personal identification code has been written in the print ticket;
- deleting the personal identification code in response to determining that the personal identification code has been written; and
- setting the personal identification code type of the print ticket to secure printing;

in response to determining that department management was selected as the personal identification code type:
- determining whether a department manager personal identification code is stored in a property bag;
- overwriting the personal identification code with the department manager personal identification code in response to determining that the department manager personal identification code is stored in the property bag;
- maintaining the personal identification code in response to determining that the department manager personal identification code is not stored in the property bag; and
- setting the personal identification code type of the print ticket to department manager; and in response to determining that user authentication was selected as the personal identification code type:
- maintaining the personal identification code; and
- setting the personal identification code type of the print ticket to user authentication.

\* \* \* \* \*